US010419656B2

(12) United States Patent
Mueller

(10) Patent No.: US 10,419,656 B2
(45) Date of Patent: Sep. 17, 2019

(54) HOME MONITORING AND CONTROL SYSTEMS

(71) Applicant: Binatone Electronics International Ltd, Hong Kong (CN)

(72) Inventor: Karl-Heinz Mueller, Hong Kong (CN)

(73) Assignee: Binatone Electronics International Ltd., Hong Kong (HK)

( * ) Notice: Subject to any disclaimer, the term of this patent is extended or adjusted under 35 U.S.C. 154(b) by 0 days.

(21) Appl. No.: 15/291,614

(22) Filed: Oct. 12, 2016

(65) Prior Publication Data
US 2017/0104916 A1 Apr. 13, 2017

(30) Foreign Application Priority Data

Oct. 12, 2015 (GB) .................................. 1518050.8

(51) Int. Cl.
*H04L 12/28* (2006.01)
*H04N 5/232* (2006.01)
(Continued)

(52) U.S. Cl.
CPC ... *H04N 5/23206* (2013.01); *G08B 13/19684* (2013.01); *H04L 12/2823* (2013.01);
(Continued)

(58) Field of Classification Search
CPC .......... G08B 13/19684; H04L 12/2823; H04L 67/10; H04L 67/26; H04M 11/04;
(Continued)

(56) References Cited

U.S. PATENT DOCUMENTS

2006/0026017 A1* 2/2006 Walker ................... G06Q 10/00
701/31.4
2006/0206246 A1* 9/2006 Walker ................... G06Q 10/00
701/16
(Continued)

FOREIGN PATENT DOCUMENTS

DE 19634675 A1 3/1998
EP 1171857 B1 6/2003
(Continued)

OTHER PUBLICATIONS

Sai et al, Low cost automated facial recognition system (Year: 2017).*
(Continued)

*Primary Examiner* — Shan E Elahi
(74) *Attorney, Agent, or Firm* — Emily A. Shouse; Patterson Intellectual Property Law, PC

(57) ABSTRACT

A home monitoring and control system has a base unit, a monitoring system that has at least one monitoring device to output monitoring signals and a portable unit. The base unit has a base unit communications system. The portable unit has an infra red remote device controller, a human I/O interface, a portable unit communications system and a processor. The base unit communications system connects with a telecommunications landline and communicates wirelessly with the portable unit communications system. The processor processes monitoring signals provided by the monitoring system and provides notifications when that processing indicates a predefined event. The human I/O interface displays such notifications. The portable unit communications system communicates with the base unit communications system using a DECT communications protocol and with a Wi-Fi network.

19 Claims, 8 Drawing Sheets

(51) Int. Cl.
*H04L 29/08* (2006.01)
*H04M 11/04* (2006.01)
*H04N 7/18* (2006.01)
*G08B 13/196* (2006.01)
*H04W 4/80* (2018.01)
*H04W 84/12* (2009.01)
*H04W 84/18* (2009.01)

(52) U.S. Cl.
CPC .............. *H04L 67/10* (2013.01); *H04L 67/26* (2013.01); *H04M 11/04* (2013.01); *H04N 5/23245* (2013.01); *H04N 7/181* (2013.01); *H04N 7/188* (2013.01); *H04W 4/80* (2018.02); *H04M 2250/08* (2013.01); *H04W 84/12* (2013.01); *H04W 84/18* (2013.01)

(58) Field of Classification Search
CPC .......... H04M 2250/08; H04N 5/23206; H04N 5/23245; H04N 7/181; H04N 7/188; H04W 4/80; H04W 84/12; H04W 84/18
USPC ........................................................... 348/159
See application file for complete search history.

(56) References Cited

U.S. PATENT DOCUMENTS

| | | | | |
|---|---|---|---|---|
| 2007/0146127 | A1* | 6/2007 | Stilp | G08B 1/08 340/531 |
| 2009/0249443 | A1* | 10/2009 | Fitzgerald | H04L 63/10 726/2 |
| 2011/0102588 | A1* | 5/2011 | Trundle | G08B 13/196 348/143 |
| 2012/0143383 | A1* | 6/2012 | Cooperrider | H04Q 9/00 700/295 |
| 2012/0313785 | A1* | 12/2012 | Hanson | G08B 21/24 340/573.1 |
| 2013/0215266 | A1* | 8/2013 | Trundle | G08B 13/19602 348/143 |
| 2013/0225233 | A1* | 8/2013 | Elter | H04M 1/2535 455/552.1 |
| 2014/0062692 | A1* | 3/2014 | Li | G08B 13/189 340/521 |
| 2014/0317710 | A1 | 10/2014 | Sager et al. | |
| 2015/0024737 | A1* | 1/2015 | Fox | H04L 41/5025 455/425 |
| 2015/0248825 | A1* | 9/2015 | Hanson | A61B 5/0077 348/77 |
| 2015/0301513 | A1* | 10/2015 | Sager | H04Q 9/00 700/90 |
| 2016/0314782 | A1* | 10/2016 | Klimanis | G10L 15/065 |
| 2016/0358436 | A1* | 12/2016 | Wautier | G08B 13/19682 |

FOREIGN PATENT DOCUMENTS

| | | |
|---|---|---|
| WO | 9946923 A1 | 9/1999 |
| WO | 0063862 A1 | 10/2000 |

OTHER PUBLICATIONS

Ishiguro et al, Implementation of a wireless communication technologies based home security system (Year: 2011).*

Gordon Kelly "Tado Smart Thermostat Review", Trusted Reviews (online), Jan. 13, 2015, 7 pp.

Evan Kypreos "Hive Active Heating 2 Review", Trusted Reviews (online), Feb. 8, 2015, 6 pp.

Andy Vandervell "Nest Cam Review", Trusted Reviews (online), Sep. 28, 2015, 7 pp.

Alastair Stevenson "Panasonic Home Monitoring and Control Kit Review", Trusted Reviews, Oct. 7, 2015, 7 pp.

UK Intellectual Property Office Search Report in corresponding Application No. GB 1518050.8, dated Jun. 17, 2016, 2 pp.

* cited by examiner

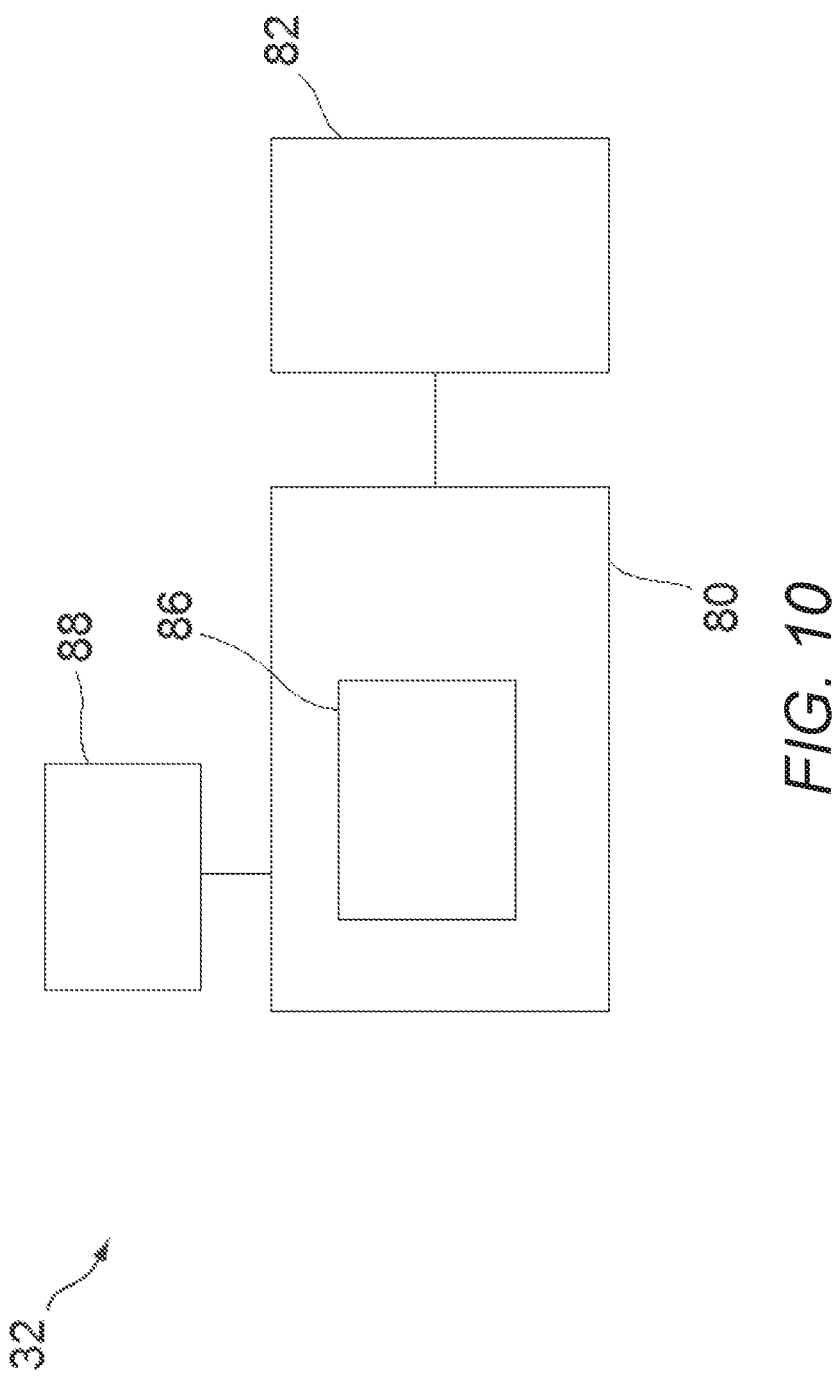

HOME MONITORING AND CONTROL SYSTEMS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: GB1518050.8 filed Oct. 12, 2015.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The invention relates to home monitoring and control systems.

It is known to provide devices in the home that can be contacted over the internet using a Smartphone. For example, a controller for a home heating system may be switched remotely by commands sent from a suitably programmed Smartphone. Thus, a homeowner may install suitable software, or an app, on their Smartphone and during a homeward journey operate the Smartphone to cause the controller to turn the heating system on to heat the home ahead of their homecoming.

It is known to provide security devices that can output alerts to a remote location, such as a police station or facility owned by a security provider. Such security systems may output messages to a Smartphone that is loaded with suitable software.

BRIEF SUMMARY OF THE INVENTION

The invention provides a home monitoring and control system as specified in the claims.

BRIEF DESCRIPTION OF THE SEVERAL VIEWS OF THE DRAWINGS

In order that the invention may be well understood, some examples thereof, which are given by way of example only, will now be described with reference to the drawings in which:

FIG. 10 is a schematic illustration of a cloud service.

DETAILED DESCRIPTION OF THE INVENTION

Figure 1:
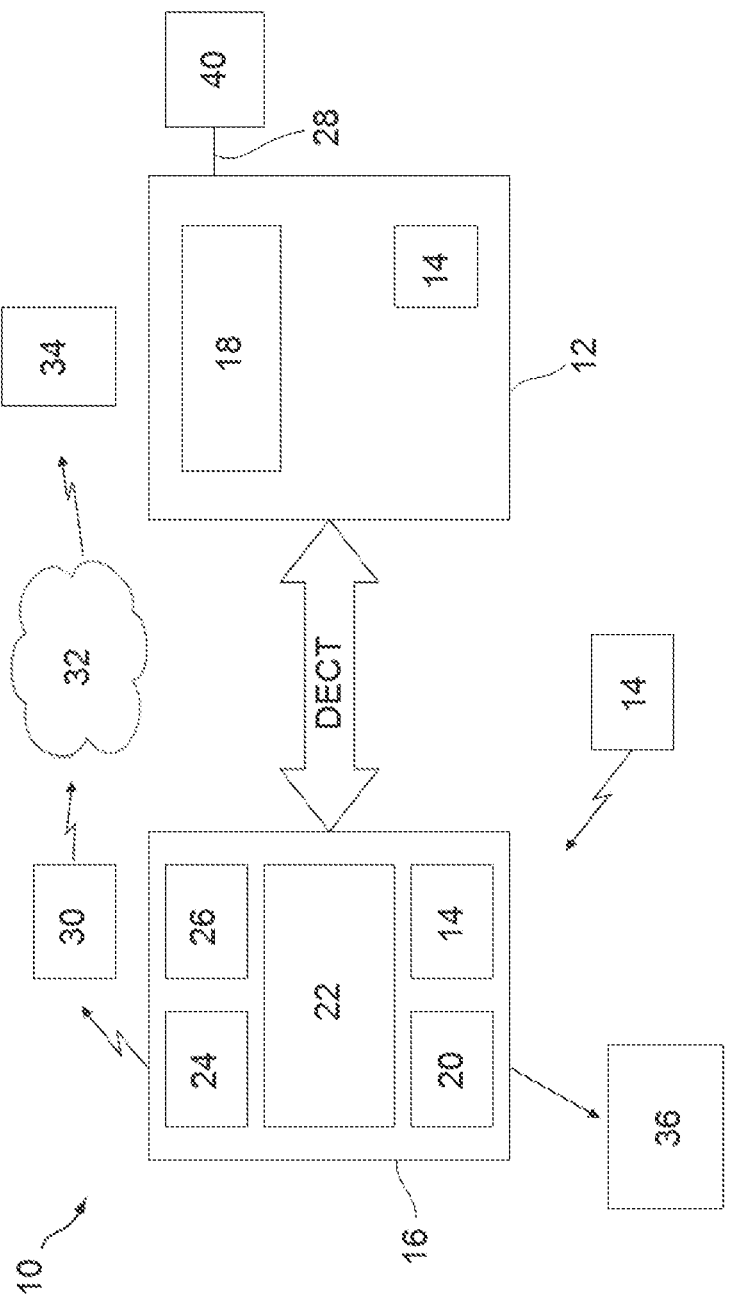
FIG. 1 is a schematic illustration of an example of a home monitoring and control system.

Referring to FIG. 1, a home monitoring and control system 10 comprises a base unit 12, a monitoring unit comprising at least one monitoring device 14 configured to output monitoring signals and a portable unit 16. The base unit 12 comprises a base unit communications system 18. The portable unit 16 comprises an infra red remote device controller 20, a human I/O interface 22, a portable unit communications system 24 and a processing system 26. The base unit communications system 18 is configured to be connected with a telecommunications landline 28 and wirelessly communicate with the portable unit communications system 24. The processing system 26 is configured to process monitoring signals provided by the monitoring device or devices 14 and provide notifications when that processing indicates a predefined event has taken place. The human I/O interface 22 is configured to display such notifications. The portable unit communications system 24 is configured to communicate with the base unit communications system 18 using a DECT communications protocol and to communicate with a Wi-Fi network.

The portable unit communications system 24 may communicate with a Wi-Fi network via a modem 30. The portable unit communications system 24 may use the Wi-Fi network to communicate with a cloud service 32 via which notifications can be broadcast to at least one remote receiver 34 associated with the home monitoring and control system 10. As described in more detail below, the at least one remote receiver 34 may be a Smartphone or the like.

The infra red remote control device 20 may be configured to control devices, or appliances, 36 located in the home. As explained in more detail below, the devices, or appliances, may include air conditioning units and entertainments devices.

In the example illustrated in FIG. 1, the monitoring unit is shown as comprising at least one monitoring device 14 provided in the base unit 12, at least one monitoring device 14 provided in the portable unit 16 and at least one remotely located monitoring device 14. Monitoring signals from the at least one monitoring device 14 provided in the base unit 12 may be communicated to the portable unit communications system 24 by the base unit communications system 18 using the DECT communications protocol operated by the home monitoring and control system 10. Monitoring signals output by the at least one remotely located monitoring device 14 may be communicated to the portable unit communications system 24 wirelessly. The at least one remotely located monitoring device 14 may, for example, communicate with the portable unit communications system 24 by means of Wi-Fi, Bluetooth®, DECT/ULE or a specific 2.4 GHz radio frequency according to what may be convenient or is required for the particular monitoring device selected. It is to be understood that it is not essential to have a remotely located monitoring device and that the home monitoring and control system 10 may be provided with at least one monitoring device 14 in each of the base unit 12 and portable unit 16 or, in some examples, in just one of those.

Figure 2:
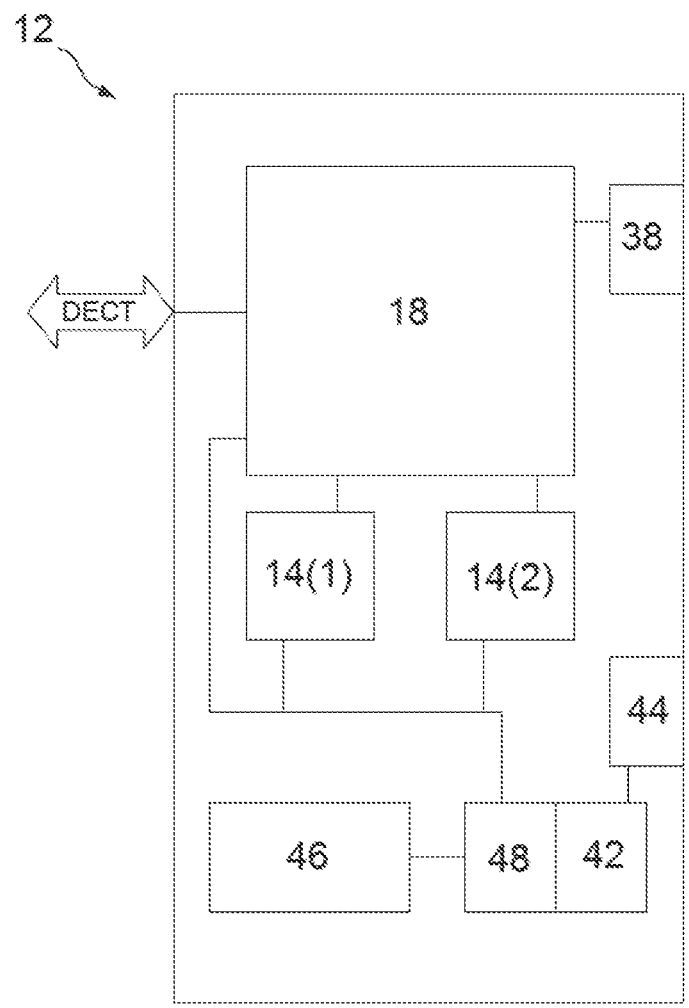
FIG. 2 is a schematic illustration of an example of a base unit that may form a part of the home monitoring and control system.

Referring to FIG. 2, there is shown an example of a base unit 12 that may form a part of the home monitoring and control system 10 shown in FIG. 1. The base unit communications system 18 comprises a processor and a DECT run time system and is configured to make and receive telephone calls via the telecommunications landline 28. The base unit 12 may be provided with at least one suitable socket 38 to allow wired connection to the telecommunications landline 28. The base unit communications system 18 communicates with the portable unit communications system 24 using a DECT communications protocol so that the base unit 12 and portable unit 16 can be used as a cordless telephone by means of which a user can make and receive telephone calls using a public switched telephone network (PSTN) 40.

In the example illustrated by FIG. 2, the base unit 12 is provided with two monitoring devices 14(1), 14(2). The two monitoring devices 14(1), 14(2) may comprise an environmental sensor 14(1) and a PIR motion sensor 14(2). The environmental sensor 14(1) may be for detecting air quality or temperature. For example, the environmental sensor 14(1) may be for monitoring carbon monoxide levels, pollution levels in terms of dust particles (PM), humidity or temperature. Monitoring signals output by the monitoring devices 14(1), 14(2) feed to the base unit communications system 18, which is configured to perform any desirable signal conditioning prior to communicating the signals to the portable unit communications system 24 using the DECT communications protocol operated by the home monitoring and control system 10.

The base unit 12 may comprise a power supply unit 42 and a socket 44 for connection with a power lead by means of which a mains electrical supply is connected with the power supply unit. The power supply unit 42 may include a transformer suitable for converting the mains electricity supply to a suitable DC voltage. However, typically the power lead supplied with the base unit 12 (not shown) will include a suitable transformer in the plug. The power supply unit 42 is configured to distribute an electrical supply to the base unit communications system 18 and the monitoring devices 14(1), 14(2). The base unit 12 may further comprise a docking station 46 for the portable unit 16. The docking station 46 may comprise a recess provided in the base unit 12. The docking station 46 may be configured to receive an end portion of the portable unit 16. The docking station 46 may be provided with a male part (not shown) configured to engage a female part of the portable unit 16 to form an electrical connection for electrical charging of a power pack 56 (FIG. 3) housed in the portable unit. Alternatively, the power supply unit 42 may comprise an inductive charging unit 48 for contactless charging of power pack 56 when the portable unit 12 is docked at the docking station 46.

Figure 3:
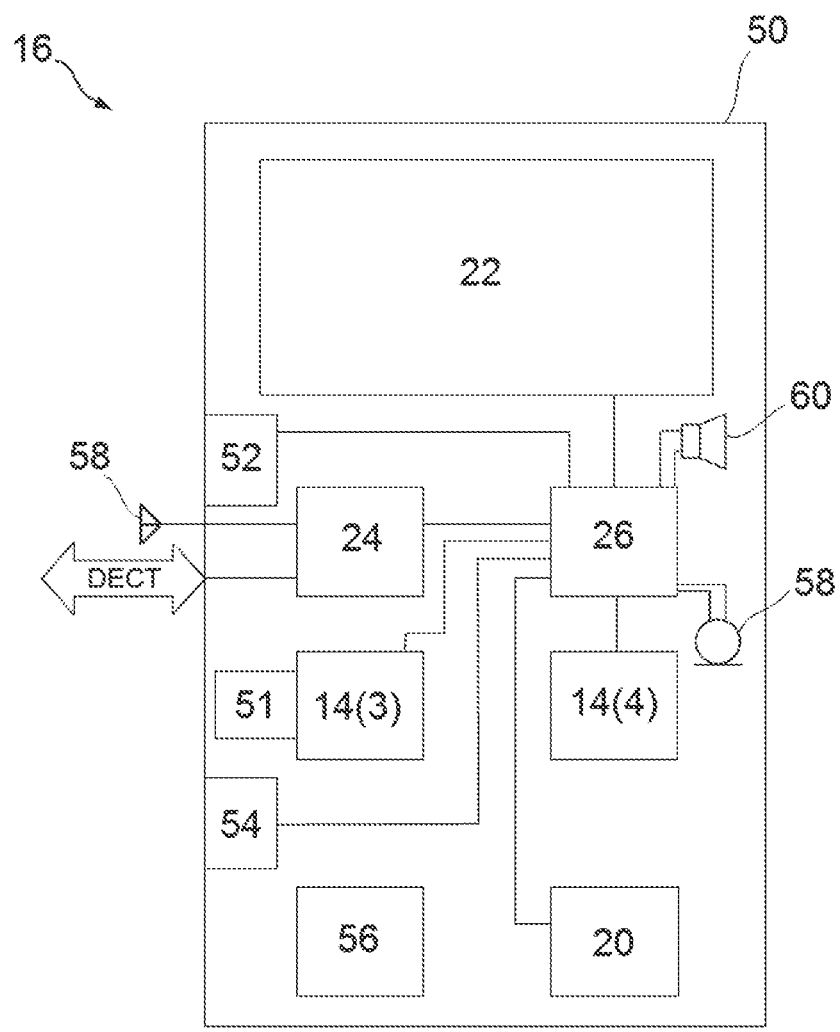
FIG. 3 is a schematic illustration of an example of a portable unit that may form a part of the home monitoring and control system.

Referring to FIG. 3, there is shown a portable unit 16 that may form a part of the home monitoring and control system shown in FIG. 1. The portable unit 16 comprises a generally rectangular body 50 configured as a handset for cordless telephone functionality. While in no way limited to this configuration, the body 50 may have a height of approximately 144 mm, a width of approximately 72.5 mm and a depth of approximately 8.5 mm. The human I/O interface 22 comprises a display, which in one example is a 5" LCD/ QHD 960×540/IPS with touch screen capability. In addition to the touch screen capability, the human I/O interface 22 may comprise one or more buttons provided, for example, on a side of the portable unit body 50. A further option would be to provide buttons or a keyboard on the front face of the portable unit body 50 adjacent the display. The processing system 26 may comprise a processor, for example a Quad-Core CPU Cortex A7 @ 1.3 GHz and memory, for example 1 GB RAM and 8 GB flash memory. The processing system 26 is provided with an operating system, which may be any suitable known operating system, including Android® operating systems such as Android OS 5.1 Lollipop.

The portable unit 16 is provided with two monitoring devices 14(3), 14(4) in the form of front and rear facing cameras. In some examples, the front facing camera 14(3) may be a VGA camera and the rear camera may be a 5 MP camera. When the portable unit 16 is mobile, the cameras 14(3), 14(4) may function normally, for example, for picture taking and video calls. When the portable unit 16 is docked at the docking station 46, the processing system 26 may automatically enable a monitoring, or surveillance, function of the cameras 14(3), 14(4) so that they can function as a part of a home security system.

One or both of the cameras 14(3), 14(4) may be provided with facial recognition software or a night vision lighting 51. The night vision lighting 51 may comprise at least one IR LED.

The portable unit 16 may be provided with one or more sockets 52 configured receive one or memory cards. For example, the portable unit 16 may be provided with a socket 52 capable of receiving a micro SD card with capacity up to 32 GB. The portable unit 16 may be provided with a socket 54 to enable a wired connection to external devices or for electrical charging of the power pack 56. The socket 54 may be a micro USB port.

The portable unit communications system 24 is configured to communicate with the base unit communications system 18 by means of a DECT communications protocol and to communicate with a Wi-Fi network. The portable unit communications system 24 may have respective antennae 58 for this purpose. The portable unit communications system 24 may also be configured for communicating with devices within the home by means of a Bluetooth protocol, for example Bluetooth LE, and DECT/ULE. In order to facilitate multi-mode radio operation with at least reduced signal clash and degradation, in some examples the portable unit communications system 24 may comprise a multi-mode transceiver as disclosed in the Applicant's US patent application, publication number 2015/0063425, the content of which is incorporated herein by reference.

The portable unit 16 is provided with a microphone 58 and a speaker 60.

The infra red remote control device 20 is configured to allow the portable unit 16 to function as a controller for devices, or appliances, 36 located in the home. For example, the infra red remote control device 20 can be used to control entertainment devices such as, Blu Ray players, DVD and video players, radios, Roku players, set-top boxes, televisions. The infra red remote control device 20 may also be used to control home appliances such as air conditioning and washing machines. For this purpose, the processing system 26 may be operable to cause a touch screen display on the human I/O interface 22 to mimic the buttons provided on dedicated remote controls for such devices and appliances. The portable unit 16 may be supplied with suitable software/ firmware to enable the infra red remote control device 20 to operate as a remote controller for various common or well known devices or appliances. The user may use the Wi-Fi functionality of the portable unit communications system 24 download additional software for other devices or appliances from a software library.

The portable unit communications system 24 may be configured to use its Wi-Fi functionality to communicate with the cloud service 32. The portable unit 16 may have an account registered with the cloud service 32 so that communications from the portable unit 16 can be recognized and processed appropriately. The account may provide access to software libraries, secured data storage and electronic processing, or computing, capability. For example, notifications transmitted to the cloud service 32 can be processed in various ways. The notifications may be transmitted to one or more users registered to the account as associated with the home monitoring and control system 10. The notifications may be transmitted via at least one of the internet and a mobile (cellular) communications network to suitably equipped remote receivers 34 associated with registered users. Suitable receivers may include PDAs, Smartphones, laptops and other devices capable of receiving electronic transmissions in the form of emails or SMS messages. In some examples, the cloud service 32 may be configured to respond to the receipt of certain predefined notifications by causing an automated telephone message to be made to one or more registered users by way of a mobile (cellular) telecommunications network or landline.

Users registered at the cloud service 32 may include the account holder who may be the owner of the premises in which the home monitoring and control system 10 is located. The registered users may include other residents at the premises as well as family members or other nominated persons. While it is not essential that the account holder and premises owner are the same person, for ease of description, the account holder and premises owner will be treated as the same person in the description that follow.

The cloud service 32 may be configured to automatically transmit certain types of notification to a subset of the registered users. For example, certain notifications may be sent to the account holder only, while others may be broadcast to all registered users. In some cases, a registered user may be disabled or enabled for specific periods of time. For example, the account holder may be disabled if overseas, while a new nominated registered user may be enabled as a substitute for the account holder for the duration of the overseas trip. Similarly, account privileges may be selectively enabled for the registered users. For example, the account holder may be the only registered user allowed to amend registered user data or add/delete registered users, but another registered user may be assigned these privileges if the account holder is going to be unavailable for a period of time, for example during a trip overseas. The account holder may be the only registered user enabled to adjust notification settings and to set up and modify various operating schemes available for the home monitoring and control system 10.

The cloud service 32 may be configured to cause some notifications to be processed manually. For example, notifications may be flagged as indicating a security breach. Such notifications may be routed electronically at the cloud service 32 for manual checking and may result in a telephone call being made to the owner of the premises via the portable unit 16 or another designated telecommunications device or to an emergency service such as the fire brigade or the police.

The processing system 26 is configured to enable the account holder, or a registered user authorized by the account holder, to access the cloud server account settings so that, for example, registered users can be added or deleted options for determining how notifications are handled by the cloud service 32 can be set. For example, the processing system 26 may cause the human I/O interface 22 to display a menu providing options determining that certain types of notifications are sent to just the account holder, while others are broadcast generally to all registered users and still others are sent to the account holder and flagged for manual processing by the cloud service 32. The menu may also provide options allowing the account holder to access software and firmware updates for the home monitoring and control system and a data library allowing the download of software, or apps, to allow the portable unit to interact with devices and appliances around the account holder's home.

Figure 5:
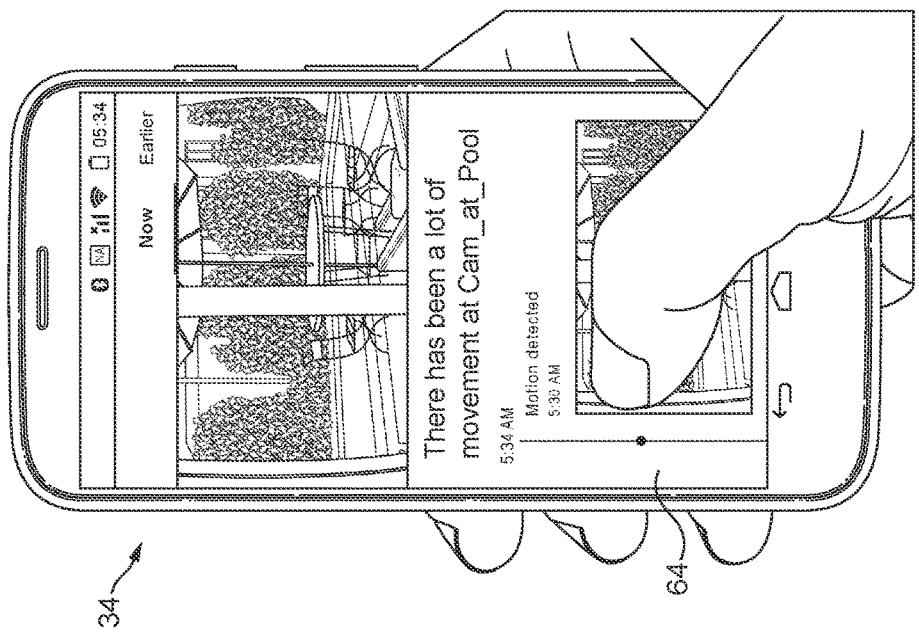
FIG. 5 shows a mobile device receiving a notification from the home monitoring and control system.
Figure 4:
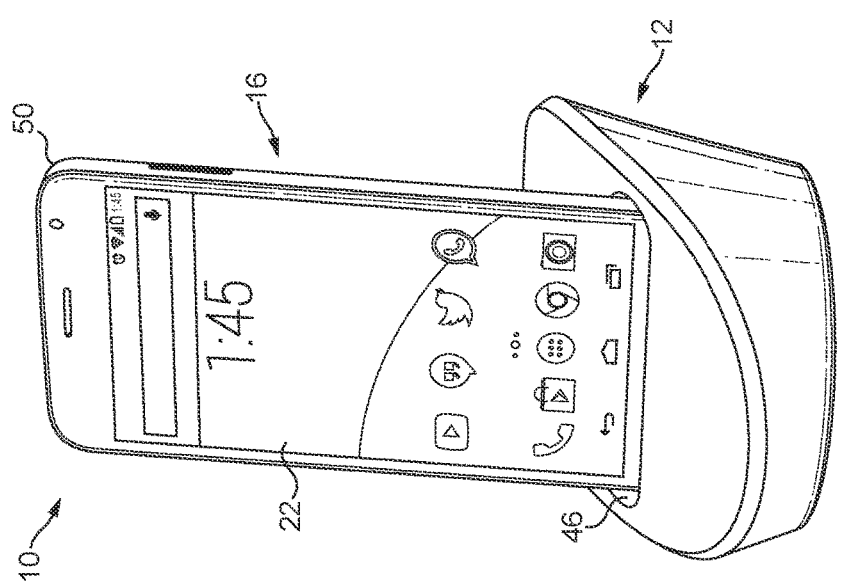
FIG. 4 shows an example of the home monitoring and control system its portable unit docked with its base unit.

FIGS. 4 and 5 illustrate an example of the home monitoring and control system 10 in a home security system mode. In FIG. 4, the portable unit 16 is docked with the docking station 46. In this condition, the power pack 56 can be recharged by the power supply unit 42 of the base unit 12. The processing system 26 of the portable unit 16 is able to detect that the unit is docked with the base unit 12. This may be by detection of an initial interaction between the power supply unit 42 and the power pack 56. In examples in which a plug and socket connection is provided for recharging a change in the potential on a pin may be used to determine the presence of the portable unit 16 in the docking station 46. When the processing system 26 becomes aware that the portable unit 16 is docked with the base unit 12, it may enable a monitoring of surveillance function of the cameras 14(3), 14(4). Because the cameras 14(3), 14(4) are forward and rear facing respectively, the portable unit 16 is able to provide a wide surveillance view in the vicinity of the base unit 12.

The processing system 26 may cause the human I/O interface 22 to show one or menus that allow the user to select various schemes allowing various parameters to determine that a detected security breach should cause the issue of silent alarms (notifications which are transmitted to the cloud service 32) only or be accompanied by a physical alarm. In cases where the physical alarm option is enabled, the processing system 26 may cause an alarm to be broadcast via the portable unit speaker 60. Alternatively, or additionally, the base unit 12 may be provided with a speaker (not shown) and the processing system 26 may cause an alarm to be broadcast via the base unit speaker. Optionally, a remote alarm device (not shown) may be located in the home and the portable unit communications system 24 may be configured to communicate wirelessly with the remote alarm device so that the remote alarm device can be activated by the processing system 26. The remote alarm device may include an audible alarm and a flashing light. When the physical alarm option is enabled, the processing system 26 may selectively cause the portable unit communications unit 24 to transmit a signal to the remote alarm to cause it to operate according to the operating scheme set by the account holder via the portable unit 16.

As previously described, the user may determine how notifications are processed by the cloud service 32. FIG. 5 illustrates an example in which the cloud service 32 has transmitted the notification to a remote receiver 34 associated with the home monitoring and control system 10. In this example, the remote receiver 34 is a Smartphone belonging to the account holder, although, it could equally be a Smartphone belonging to any registered user. The notification may be in the form of an email or SMS message. The message may simply comprise text. However, in the illustrated example, the notification includes images 64 provided by one of the cameras 14(3), 14(4). This makes it easier for the person viewing the notification to determine whether there is a security breach or the notification represents a false alarm and respond accordingly. In some examples, the cloud service 32 may allow authorized registered users to download software or an app to the remote receiver 34 that enables the user to respond to a notification by requesting the transmission of further images or a video connection. If there are further remotely located cameras, the user may be able to request access to images from those cameras. The software or app may enable the authorized user to send a command to the portable unit 16 to cause an audible or visual alarm to be triggered.

The home monitoring and control system 10 is capable of different user selectable schemes for determining whether there has been a security breach. In one example, the processing system 26 is alerted to a possible breach of security by a signal from the PIR motion sensor 14(2). The processing system 26 may then analyses images from the cameras 14(3), 14(4) for signs of movement or the presence of a human to corroborate the alert provided by the PIR motion sensor 14(2). If the analysis of the images from the cameras 14(3), 14(4) corroborates the alert from the PIR motion sensor 14(2), the processing system 26 can cause the processing unit communications system 24 to transmit a notification to the cloud service 32 for processing according to the scheme enabled, for example, by the account holder. If the analysis of the images from the cameras 14(3), 14(4) does not indicate a breach of security, the processing system 26 may determine that no notification and an alarm should not issue and instead may enable one or more subsequent analyses of images captured by the cameras 14(3), 14(4) the corroborate the initial determination. If the subsequent analyses do not indicate a breach of security, the processing system 26 may determine that there has been no breach of security and disregard the detection by the PIR motion sensor 14(2).

In some examples, the cameras 14(3), 14(4) may be provided with face recognition software. The face recognition software may be used to cause the cameras 14(3), 14(4) to locate and focus on any human in their field of view following an alert triggered by the PIR motion sensor 14(2). This may improve the ability of the home monitoring and control system 10 in detecting intruders. In some examples, the face recognition software may be capable of distinguishing faces included in a database of people authorized to be in the premises in which the home monitoring and control system is located. In such examples, if the processing system 26 is alerted to a possible breach of security by a signal from the PIR motion sensor 14(2), it can be determined that there has been no breach of security if images captured by a camera 14(3), 14(4) are of a human authorized to be in the premises.

The home monitoring and control system 10 uses monitoring signals provided by the different monitoring devices in judging, or determining, whether there has been a breach of security. Notifications may only be made and alarms triggered (when enabled) if the monitoring signals provided by one monitoring device are corroborated by signals received from another monitoring device. Thus, if the monitoring signals from the PIR motion sensor 14(2) are not supported by the monitoring signals (images) provided by at least one of the cameras 14(3), 14(4), no action is taken, although as previously described, one operating scheme for the home monitoring and control system 10 would trigger further checking shortly afterwards. Accordingly, the number of false alarms, whether in the form of notifications or actual physical alarms, should be reduced and confidence in notifications or actual physical alarms that occur should be increased.

In examples in which the home monitoring and control system 10 comprises at least one remotely located monitoring device 14 in the form of one or more further cameras, the processing system 26 may also analyses monitoring signals (images) received from the remotely located cameras to see whether these provide corroboration for the motion detection by the PIR sensor 14(2).

In some examples, the processing system 26 may forward signals provided by the monitoring devices 14 to the account address at the cloud service 32 for analysis by a more powerful computing facility there. If the analysis indicates a breach of security, notifications may be sent in the way previously described and if the scheme operated by the home monitoring and control system 10 specifies at least one of an audible and visual alarm, the cloud service 32 transmits a suitable data package to the portable unit communications system 24 via the Wi-Fi network to cause the processing system to activate the alarm. In another alternative, the cloud service 32 may cause one or more telephone calls to be made to the telephone number associated with the home monitoring and control system 10 to cause it to receive one or more incoming telephone calls to alarm a possible intruder.

Figure 6:
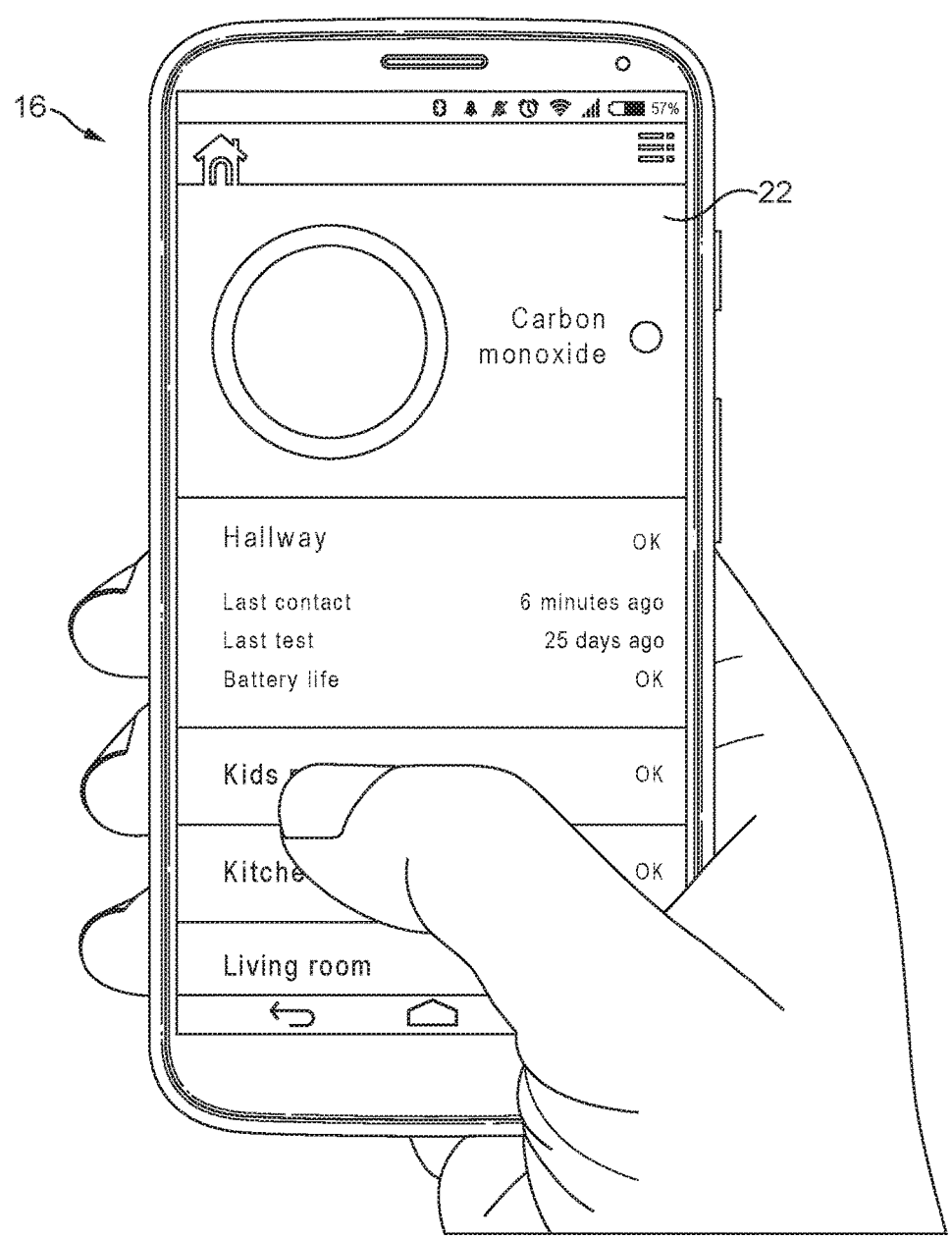
FIG. 6 shows the portable unit in environmental monitoring mode.

Referring to FIG. 6, the portable unit 16 is shown in environmental monitoring mode. In some examples, the portable unit 16 is configured to display one or more menus relating to environmental monitoring. In a simple example in which the home monitoring and control system 10 comprises just one monitoring device 14 for environmental monitoring, the operation scheme may simply allow the user to monitor a particular environment in which the monitoring device 14 is located. If there is one environmental monitoring device 14(1) provided with the base unit 12. The user is thus presented with a menu that allows checking of the environment in the room in which the base unit 12 is located based on the monitoring signals provided by the monitoring device 14(1). In the example illustrated by FIG. 6, the monitoring device 14(1) is a carbon monoxide sensor and the base unit 12 is located in the hallway. The user 16 is thus able to determine carbon monoxide levels in the hallway by calling up the output of the monitoring device 14(1). In some examples, the processing system 26 may be configured to process the output of the monitoring device 14(1) and compare the signals with one or more threshold values stored in memory. According to the results of the processing, the portable unit 16 may cause the portable unit communications system 24 to transmit a notification to the cloud service 32 via the Wi-Fi network. In some examples, if the processing indicates that a first threshold has been exceeded but a second, higher, threshold has not, the processing system 26 may be configured such that it does not issue a notification, but instead increases the frequency with which the output of the monitoring device 14(1) is analyzed. In cases in which the processing system judges that a notification should be transmitted, it may also trigger a physical alarm.

FIG. 6 illustrates a system in which there are remotely located monitoring devices 14 monitoring carbon monoxide levels in other rooms, such as the kitchen, kids' room and living room. The menu option displayed may show the status of all of the rooms monitored simultaneously as shown, or allow switching from room to room.

Although not shown, the portable unit 16 may be provided with a monitoring device in the form of an environmental sensor. This makes it possible for a user to manually carry out checks by taking the portable unit 16 to the room whose environment is to be checked.

Figure 8:
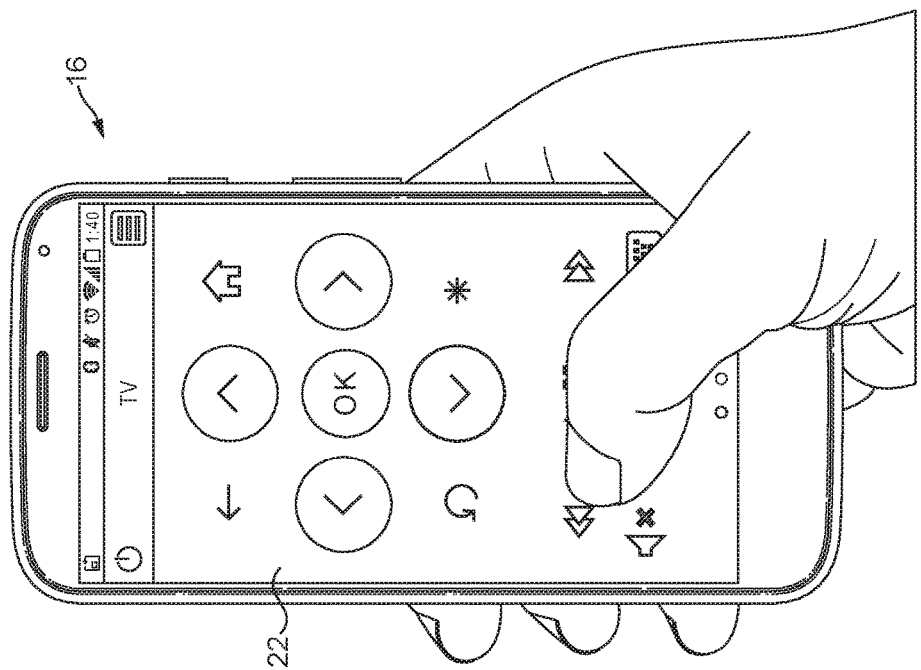
FIG. 8 shows the portable unit in remote control mode for controlling an entertainments devices.
Figure 7:
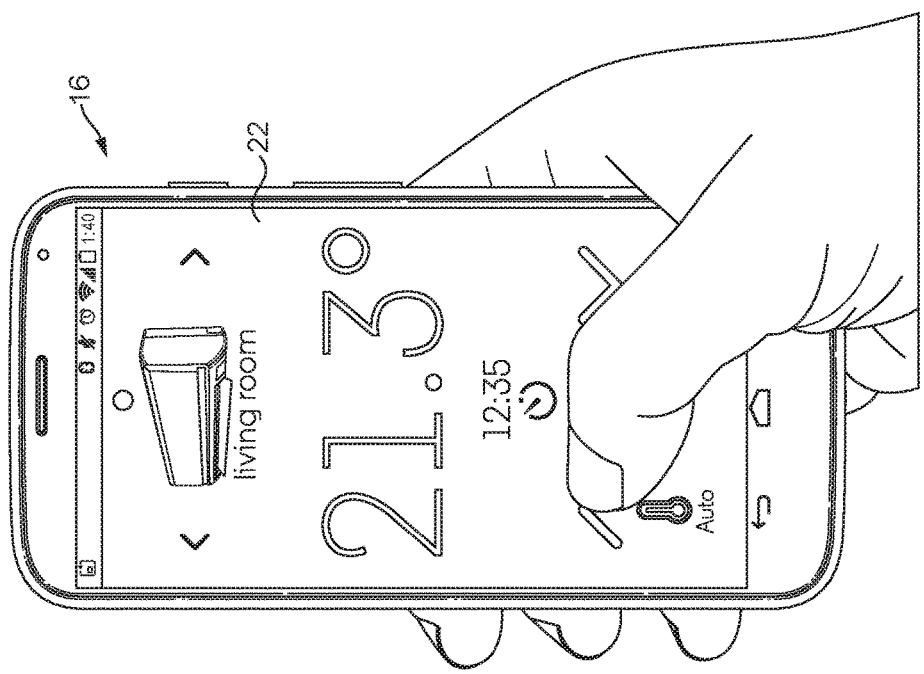
FIG. 7 shows the portable unit in remote control mode for controlling an air conditioning device.
Figure 9:
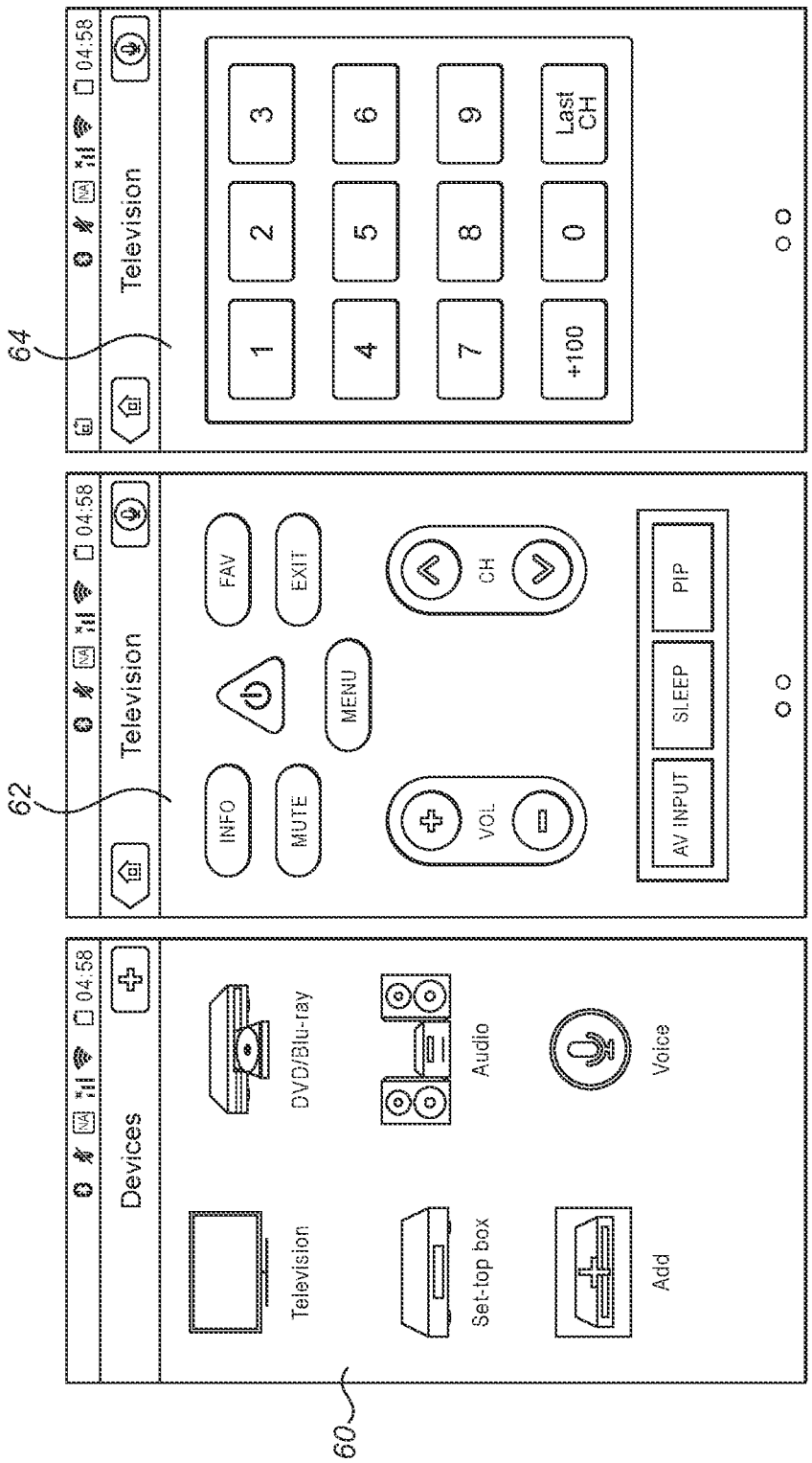
FIG. 9 shows menus that may be presented on the portable unit.

FIGS. 7 to 9 illustrate the portable unit 16 in remote control mode. FIG. 7 illustrates the portable unit 16 in use to control an air conditioning unit (not shown). FIG. 8 shows the portable unit 16 in use to control entertainments devices and FIG. 9 shows menus that may be presented by the human I/O interface 22 when the portable unit is used as a remote control for entertainments devices.

Referring to FIG. 7, the portable unit 16 is shown with a menu displayed on the human I/O interface 22 to enable control of an air conditioning unit. The menu includes various touch screen icons that allow the user to direct control signals to the air conditioning unit by means of the infra red remote device controller 20. As indicated in FIG. 7, the menu may allow scrolling to menu pages for air conditioning units in other rooms. The processing system 26 may operate software that allows the menus generated to mimic the control buttons of a physical controller for the air conditioning device or may provide a generic button arrangement. The portable communications system 24 may be configured to communicate with an onboard controller, or over device, to determine the current status of the unit. Thus, for example, it may be possible to display the current room temperature or humidity as detected by the air conditioning unit and display the current settings of the air conditioning unit, such as the temperature it is set to maintain. If the user obtains a new air conditioning unit and the software held on the portable unit 16 does not enable the infra red remote device controller 20 to control the new unit, the user may cause the portable unit communications system 24 to connect to the cloud service 32 via the Wi-Fi network to download suitable software or an app that enables such control In similar fashion, the portable unit 16 can be configured to control any household device or appliance, such as a washing machine, that accepts infra red control.

Referring to FIG. 8, the portable unit 16 is shown with a menu displayed on the human I/O interface 22 to allow control of entertainments devices. FIG. 9 illustrates various menus 60, 62, 64 that may also be displayed. For example, menu 60 allows the user to display all of the entertainments devices in the home that the portable unit 16 is configured to control. FIGS. 62, 64 show alternative or additional menus associated with controlling one or more televisions using the infra red remote device controller 20. If the user obtains a new entertainments device and the software held on the portable unit 16 does not enable the infra red remote device controller 20 to control the new device, the user may cause the portable unit communications system 24 to connect to the cloud service 32 via the Wi-Fi network to download suitable software or an app that enables such control.

In the preceding description the home monitoring and control system is described as operating as a controller for devices that can function in a security mode, entertainments devices and home appliances. In addition to the example previously given, the home monitoring and control system may be configured to control one or more domestic lights, including entire lighting circuits, heating systems, and electrical door locking systems and electrically actuated garage doors.

In the preceding description, the processing system of the portable unit is primarily responsible for processing the monitoring signals provided by the monitoring devices and determining the actions to be taken based on the results of the processing. It is to be understood that in other examples, the portable unit may function to a greater or lesser extent as a conduit via which information is transmitted to the cloud service at which it is electronically processed according to operation schemes selected by the account holder via the portable unit. The cloud service is configured to transmit notifications to registered users or transmit commands or requests for further information to the portable unit. In either scenario, the portable unit functions as the hub of the home monitoring and control system.

It is to be understood that the term cloud service is to be interpreted broadly as encompassing a remote service operating on electronic hardware with which the portable unit can communicate via the internet. As illustrated by FIG. 9, a cloud service 32 may, for example, comprise one or more servers 80 and communications apparatus 82 capable of transmitting electronically to the portable unit 16 and remote receiver devices 34 and receiving electronic transmissions from the portable unit 16 and remote receiver devices 34, typically via the internet and a mobile (cellular) telephone network. The server or servers 80 may comprise one or more processors 84 and electronic data storage 86. The electronic data storage 86 may comprise permanent memory in the form of one or more hard disk drives or solid state drives to store executable instructions for operating the cloud service, user data accounts and apps, software and updates for the home monitoring and control system 10. Permanent memory capacity 88, for example a RAID disk array, may be connected with the server or servers 80 to provide additional data storage capacity.

It will be understood that the home monitoring and control system described provides the possibility of having a single device to control the electronic devices in a home and communicate with a cloud service to provide notifications to remote receivers associated with registered users of the system and alarm functionality. The home monitoring and control system also allows registered users with the necessary authorization to send commands or requests for information to the system via the cloud service.

Thus, although there have been described particular embodiments of the present invention of a new and useful Home Monitoring and Control Systems it is not intended that such references be construed as limitations upon the scope of this invention except as set forth in the following claims.

What is claimed is:

1. A home monitoring and control system comprising:
a base unit having a base unit communications system;
a monitoring unit comprising a plurality of monitoring devices configured to output monitoring signals; and
a portable unit comprising a telephonic communications handset having an infra red remote device controller, a human input/output interface comprising a display, a portable unit communications system, at least one said monitoring device and a processor, wherein said at least one monitoring device comprises at least one imaging device,
wherein,
said base unit defines a docking station for said telephonic communications handset and said base unit communications system is configured to be wire connected with a telecommunications landline and communicate wirelessly with said telephonic telecommunication handset to enable said telephonic communications handset to make and receive telephone calls via said telecommunications landline, said processor is configured to cause said at least one imaging device to operate in surveillance mode when said telecommunications handset is docked with said base unit, said processor is configured to process said monitoring signals and provide notifications when said processing indicates at least one a predefined event, said at least one predefined event comprises a security breach determined by said processor based on monitoring signals received from said at least one imaging device operating in surveillance mode, and said portable unit communications system is configured to communicate with said base unit communications system using a DECT communications protocol and to transmit designated said notifications to a specified remote system via a Wi-Fi network.

2. The home monitoring and control system claimed in claim 1, wherein said portable unit communications system is further configured to communicate with external devices using a Bluetooth communications protocol.

3. The home monitoring and control system claimed in claim 1, wherein said monitoring unit comprises at least one said monitoring device carried by said base unit.

4. The home monitoring and control system claimed in claim 3, wherein said at least one monitoring device carried by said base unit comprises at least one of:
a) an air quality sensor;
b) a temperature sensor; and
c) a PIR motion sensor.

5. The home monitoring and control system as claimed in claim 1, wherein said at least one imaging device comprises an imaging device provided with at least one of:
a) facial recognition software; and
b) night vision lighting.

6. The home monitoring and control system claimed in claim 1, wherein said base unit further comprises an electrical charger to charge a power unit of said portable unit and said processor and said electrical charger is connected with said power unit by docking said portable unit with said base unit.

7. The home monitoring and control system claimed in claim 1, wherein said processor is configured to provide notifications of a said security breach-only when the processing of respective monitoring signals from said at least one imaging device and at least one other said monitoring device indicates said security breach.

8. The home monitoring and control system claimed in claim 1, wherein said processor is configured to cause at least some said notifications to be notified via said human input/output interface.

9. The home monitoring and control system claimed in claim 1, wherein said specified remote system is at least one of:
a portable telecommunications device; and
a cloud system.

10. The home monitoring and control system claimed in claim 1, wherein said infra red remote device controller can control at least one of an entertainment device and a home appliance.

11. A home monitoring and control system comprising:
a base unit;
a monitoring unit comprising a plurality of monitoring devices configured to output respective monitoring signals;
a portable unit comprising a telephonic communications handset; and
a cloud service, wherein
said plurality of monitoring devices comprises at least one imaging device, said base unit comprises a base unit communications system configured to be wire connected to a telecommunications landline and communicate wirelessly with said telephonic communications handset, and said telephonic communications handset comprises at least one said imaging device, a processor, a portable unit communications system, an infra red remote device controller whereby said portable unit can be operated to remotely control at least one entertainment device, wherein said processor is configured to process said monitoring signals and provide notifications when said processing indicates a predefined event, and said portable unit communications system is configured to communicate wirelessly:
i) with said base unit communications system using a DECT communications protocol such that said telephonic communications handset can be used to make and receive telephone calls via said telecommunications landline; and
ii) with said cloud service via a Wi-Fi network such that said processor can cause transmission of designated said notifications to said cloud service.

12. The home monitoring and control system claimed in claim 11, provided with image recognition software whereby said at least one imaging device can distinguish human faces.

13. The home monitoring and control system claimed in claim 11, wherein said at least one imaging device is provided with night vision lighting.

14. The home monitoring and control system claimed in claim 11, wherein said processor is configured to generate notifications of a first designated event when respective monitoring signals from at least two said monitoring devices indicate said first designated event.

15. The home monitoring and control system claimed in claim 14, wherein said base unit is provided with at least one monitoring device and said at least one monitoring device comprises a PIR motion sensor, said processing device is configured to provide notifications of said first designated event only when respective monitoring signals from said at least one imaging device and said PIR motion sensor indicate said first designated event and said first event is a security breach.

16. The home monitoring and control system claimed in claim 11, wherein said infra red remote device controller can further remotely control at least one home appliance.

17. The home monitoring and control system claimed in claim 16, wherein said cloud service comprises electronic data storage and said portable unit communications system can access said electronic data storage via said Wi-Fi network to download software or firmware to enable said infra red remote device controller to control said at least one of an entertainment device and a home appliance.

18. The home monitoring and control system claimed in claim 11, wherein said telephonic communications handset further comprises a human input/output interface comprising at least a touch screen.

19. A home monitoring and control system comprising:
a base unit;
a monitoring unit comprising a plurality of monitoring devices configured to output respective monitoring signals;

a portable unit comprising a telephonic communications handset having a processor, at least one monitoring device comprising an imaging device and an infra red remote device controller whereby said telephonic communications handset is operable to remotely control at least one entertainment device; and a cloud service, wherein said base unit defines a docking station for said telephonic communications handset and said base unit and comprises a base unit communications system configured to be wire connected to a telecommunications landline and communicate wirelessly with said telecommunications handset, said telephonic communications handset comprises a portable unit communications system configured to communicate wirelessly:

i) with said base unit communications system using a DECT communications protocol such that said telephonic communications handset can be used to make and receive telephone calls via said telecommunications landline; and ii) with said cloud service via a Wi-Fi network such that said processing unit communications system can transmit signals at least representative of said monitoring signals to said cloud service, and said cloud service is configured to electronically process said signals and when said processing indicates a predefined event to transmit at least one of:

i) notifications to a remote receiver device; and ii) commands to said portable unit communications system for implementation by said processor.

* * * * *